(12) United States Patent
McDonald et al.

(10) Patent No.: US 7,162,655 B2
(45) Date of Patent: Jan. 9, 2007

(54) METHOD AND SYSTEM FOR INFORMATION HANDLING SYSTEM POWER CONTROL

(75) Inventors: Brent A. McDonald, Round Rock, TX (US); John A. Herrmann, Cedar Park, TX (US); Daniel E. Jenkins, Bastrop, TX (US)

(73) Assignee: Dell Products, L.P., Round Rock, TX (US)

( * ) Notice: Subject to any disclaimer, the term of this patent is extended or adjusted under 35 U.S.C. 154(b) by 474 days.

(21) Appl. No.: 10/620,945

(22) Filed: Jul. 16, 2003

(65) Prior Publication Data

US 2005/0015631 A1    Jan. 20, 2005

(51) Int. Cl.
*G06F 1/26* (2006.01)
(52) U.S. Cl. .................... 713/320; 713/300; 713/340
(58) Field of Classification Search ............. 713/300, 713/320, 340
See application file for complete search history.

(56) References Cited

U.S. PATENT DOCUMENTS

| | | | | |
|---|---|---|---|---|
| 5,349,515 | A | | 9/1994 | Megeid ........................ 363/21 |
| 5,656,923 | A | * | 8/1997 | Schultz et al. ............... 323/207 |
| 5,751,121 | A | * | 5/1998 | Toyama et al. .............. 315/307 |
| 5,998,886 | A | * | 12/1999 | Hoshino et al. ................ 307/66 |
| 6,366,483 | B1 | * | 4/2002 | Ma et al. ....................... 363/87 |
| 6,374,085 | B1 | * | 4/2002 | Saints et al. ................... 455/69 |
| 6,384,491 | B1 | * | 5/2002 | O'Meara ...................... 307/86 |
| 6,400,584 | B1 | | 6/2002 | Sabate et al. .................. 363/22 |
| 6,522,112 | B1 | * | 2/2003 | Schmoock et al. .......... 323/280 |
| 6,567,261 | B1 | * | 5/2003 | Kanouda et al. ............. 361/502 |
| 6,593,725 | B1 | * | 7/2003 | Gallagher et al. ........... 323/284 |
| 6,597,299 | B1 | | 7/2003 | Bugeja ........................ 341/122 |
| 6,687,049 | B1 | * | 2/2004 | Sulhoff et al. ............. 359/341.4 |
| 6,993,305 | B1 | * | 1/2006 | Kasperkovitz ............ 455/232.1 |
| 2002/0086709 | A1 | * | 7/2002 | Saito et al. ................... 455/561 |
| 2003/0035206 | A1 | * | 2/2003 | Pavel et al. ............... 359/341.4 |
| 2003/0098679 | A1 | * | 5/2003 | Odaohhara ................... 323/284 |
| 2004/0114215 | A1 | * | 6/2004 | Tian et al. .............. 359/341.41 |
| 2004/0263225 | A1 | * | 12/2004 | Perrott et al. ................ 327/156 |
| 2006/0097797 | A1 | * | 5/2006 | Gomez ......................... 331/16 |

* cited by examiner

*Primary Examiner*—Malcolm Cribbs
(74) *Attorney, Agent, or Firm*—Hamilton & Terrile, LLP; Robert W. Holland

(57) ABSTRACT

Power supply response to variations in power demand by a microprocessor is improved with a compensation loops that estimate changes in load current with improved speed. The load current estimate is performed in part with a capacitance feed forward compensation loop that senses voltage at output capacitors to replicate the current present in the capacitors and communicates the capacitor current adjusted by an optimized gain to the power supply for adjustment of power output. Capacitor current is replicated with a frequency domain filter having a pole that cancels out the zero created by power supply equivalent series resistance and capacitor capacitance. The capacitance compensation loop improves power supply response time to microprocessor power demand skews so that the size or number of output capacitors may be reduced while still maintaining power supply at the microprocessor to within desired voltage and current tolerances.

19 Claims, 3 Drawing Sheets

METHOD AND SYSTEM FOR INFORMATION HANDLING SYSTEM POWER CONTROL

BACKGROUND OF THE INVENTION

1. Field of the Invention

The present invention relates in general to the field of information handling system power control, and more particularly to a method and system for feed forward control loop optimization of processor power.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One reason that information handling systems have grown in capability over time is that the microprocessors that run as central processing units (CPUs) for information handling systems have packed an increasing number of circuits in a given space. Microprocessors with greater numbers of circuits have greater processing power to perform information processing but also have greater power demands and greater variations in power demand over time. For instance, present state-of-the-art microprocessors have relatively large load steps, such as 80 amps at rates of 400 amps per microsecond, which require power supplies to have relatively low output impedance. Future microprocessors will likely have even greater step loads and higher slew rates as microprocessor circuit density continues to increase. Further, as microprocessors grow more complex, the tolerances for power supply processor voltage requirements will narrow so that power supplies must respond to changes in microprocessor power use even more rapidly and with greater accuracy, which will result in increasingly expensive power supply solutions.

One solution for control of power supplied to a microprocessor is to use feedback of voltage and current provided by the power supply with conventional loop optimization techniques and sufficient output capacitance to meet the microprocessor current and voltage requirements. One difficulty with this solution is that, as the current slew rates expected of the power supply increase and the tolerances of the microprocessor tighten, the number and/or size of output capacitance increases to keep processor voltage within desired tolerances. The capacitors are added at the output of the power supply and the microprocessor to supply current rapidly enough to maintain voltage at the microprocessor within the desired tolerances. However, the addition of capacitance to meet slew rate and tolerance requirements generally increases the size and expense of the power supply. Increased processor current slew rates and narrowing voltage tolerance requirements of present and future microprocessors will result in expensive and large capacitance-based solutions to ensure proper operation of information handling systems.

SUMMARY OF THE INVENTION

Therefore a need has arisen for a method and system which improves information handling system power supply response to changes in microprocessor power demand to reduce the output capacitance needed to maintain power supplied at a microprocessor to within desired tolerances.

In accordance with the present invention, a method and system are provided which substantially reduce the disadvantages and problems associated with previous methods and systems for information handling system power supply. A capacitance compensation loop estimates current present in output capacitors to command more rapid power supply response to changes in microprocessor power demand. The improved power supply response reduces the size and/or quantity of the output capacitance needed to maintain power supplied at the microprocessor to within desired tolerances.

More specifically, an information handling system power supply attempts to maintain power supplied at a CPU to within desired voltage and current tolerances by responding to changes in power demanded by the CPU with voltage and current compensation loops. One or more output capacitors are disposed between the power supply and the CPU to buffer current during delays in power supply response to changes in power demand by the CPU. Power supply response time is reduced to reduce the size of the capacitor by interfacing a capacitance compensation loop with the power supply to allow the power supply to respond to changes in load current, including current present in the output capacitor. The capacitance compensation loop is a feed forward loop that senses voltage across the output capacitors and applies the sensed voltage to replicate the current present in the output capacitor. The estimated capacitor current is adjusted by an optimized gain and communicated to the power supply to adjust power output. The capacitance compensation loop estimates capacitance current with a frequency domain filter having a pole that cancels out the zero created by equivalent series resistance and capacitance of the power supply circuit.

The present invention provides a number of important technical advantages. One example of an important technical advantage is that power supply output is controlled more effectively to achieve reduced output impedance and less reliance on output capacitance to maintain power supplied at a microprocessor to within desired tolerances. The capacitance feed forward compensation loop provides changes in load current to the power supply in a rapid manner by estimating the current present in output capacitors so that the power supply is able to respond to changes in microprocessor power consumption in a more rapid manner. For instance, if increased microprocessor power draw requires current from output capacitors, the feed forward loop informs the power supply to increase power supply output with less reliance on current supply from output capacitors. If decreased microprocessor power draw results in current that charges the output capacitors, the feed forward loop informs the power supply to decrease power supply output. By responding to estimates of current present in output capacitors, the feed forward loop reduces the overall size of output capacitance needed to buffer delays in power supply response to changes of microprocessor power demand.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Power supplied to an information handling system microprocessor is adjusted in response to load current by estimating the current present in output capacitors and using the estimated output capacitor current to control power supply output with reduced output impedance. More rapid power supply response to load current changes based on feed forward control of estimated output capacitor current reduces the size and expense of output capacitors for an information handling system to operate with microprocessors having relatively large power slew rates and relatively tight voltage and current constraints. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (V/O) devices, such as a keyboard, a mouse, and a video display. The information handling system may also include one or more buses operable to transmit communications between the various hardware components.

Figure 1:
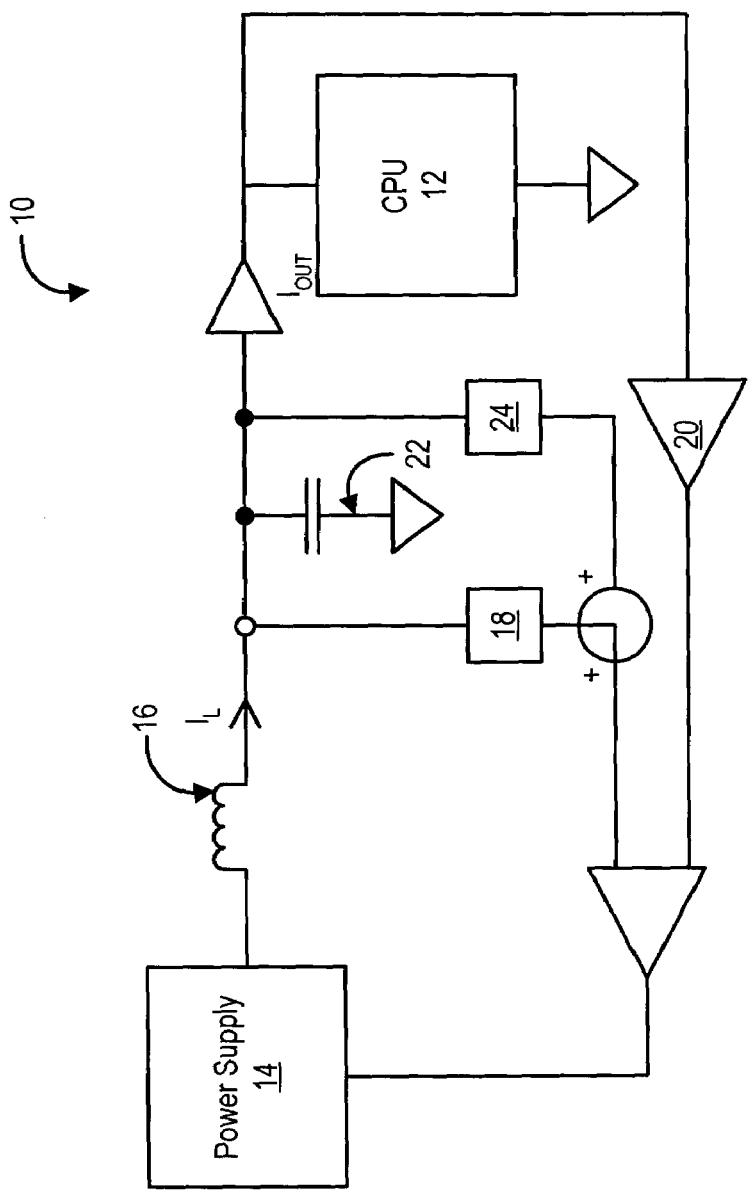
FIG. 1 depicts a circuit diagram of an information handling system having capacitance feed forward loop for power supply control.

Referring now to FIG. 1, a circuit diagram depicts one embodiment of the present invention provided in an information handling system 10 to control power supplied to a CPU 12. CPU 12 processes information for use by other components of information handling system 10, such as memory or display, with power supplied from a power supply 14 through an inductor 16 to CPU 12. Power supply 14 adjusts its output of power to CPU 12 in response to changes in power demand of CPU 12 by gain adjusted measurements of the voltage and current provided through a current feed back loop 18 and a voltage feed back loop 20. To reduce the closed loop output impedance, output capacitors 22 buffer changes in power drawn by CPU 12 during load steps until the power supply 14 has time to respond to signals from current feed back loop 18 and voltage feedback loop 20 and correct its output current. Power supply 14 may be a single phase or multiphase power supply supply.

The size and/or number of capacitors 22 depends upon the load step requirements of CPU 12 and the response time of power supply 14 to such load steps. Greater load steps and slower power supply responses results in increased need for output capacitance to meet a given power supply tolerance of voltage and step load current requirements at CPU 12. Thus, the present invention seeks to reduce the size and/or number of capacitors 22 by reducing the need for output capacitance with shortened response time of power supply 14 to changes in power demand of CPU 12. An output capacitance feed forward control loop 24 improves the response of power supply 14 by estimating load current to CPU 12 with a replication of current present in output capacitors 22. Feed forward control loop 24 replicates the actual current present in output capacitors 22 by using a filter with a pole to cancel out the zero created by the equivalent series resistance and output capacitance of the power supplied to CPU 12. An optimized gain parameter applied to the pole provides faster responses of power supply 14 to changes in power demand of CPU 12 to reduce the reliance on output capacitance to meet voltage and current requirements at CPU 12 while maintaining low impedance.

Figure 2:
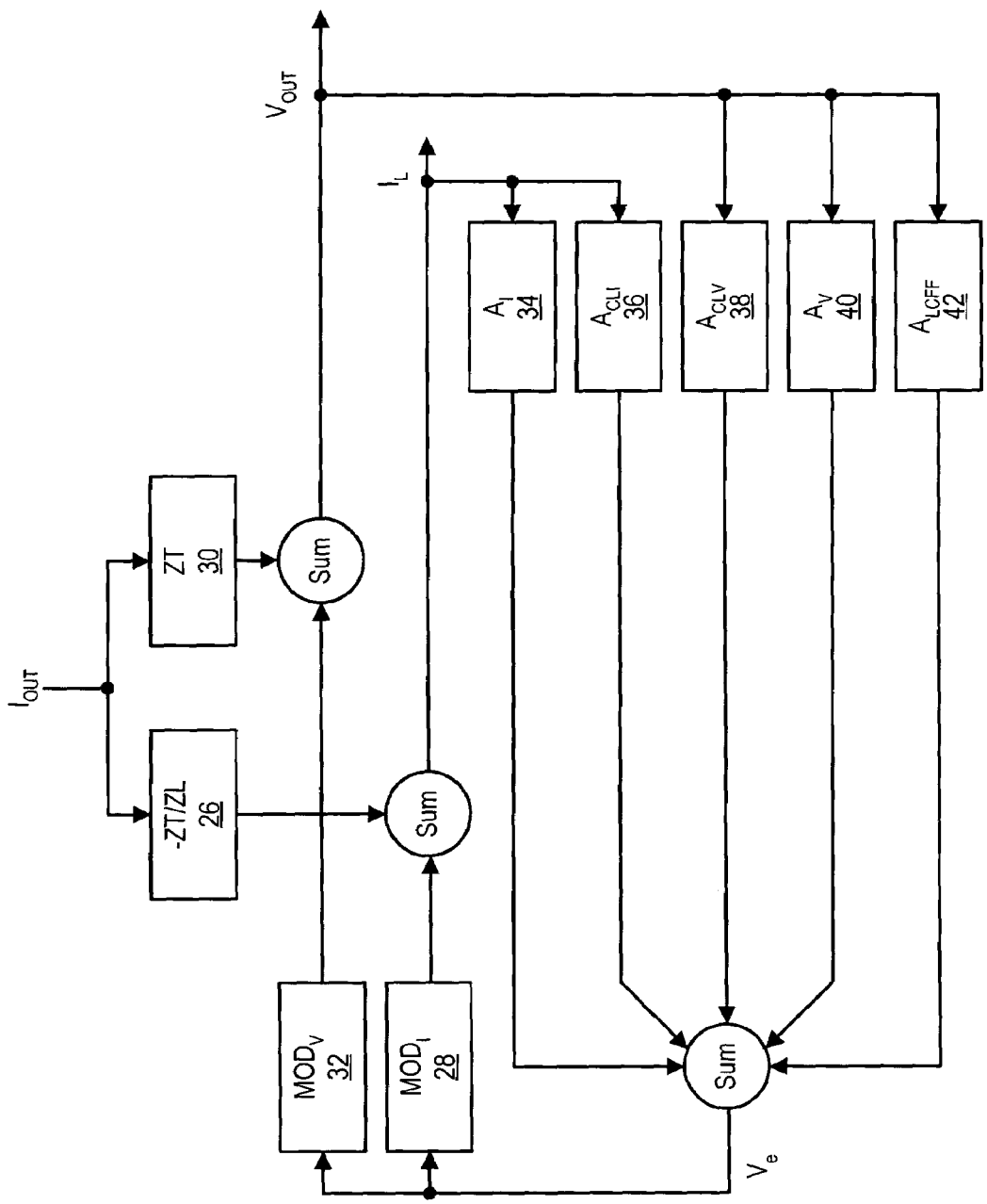
FIG. 2 depicts a block diagram of a frequency domain model of the power supply control provided by the circuit of FIG. 1.
Figure 3:
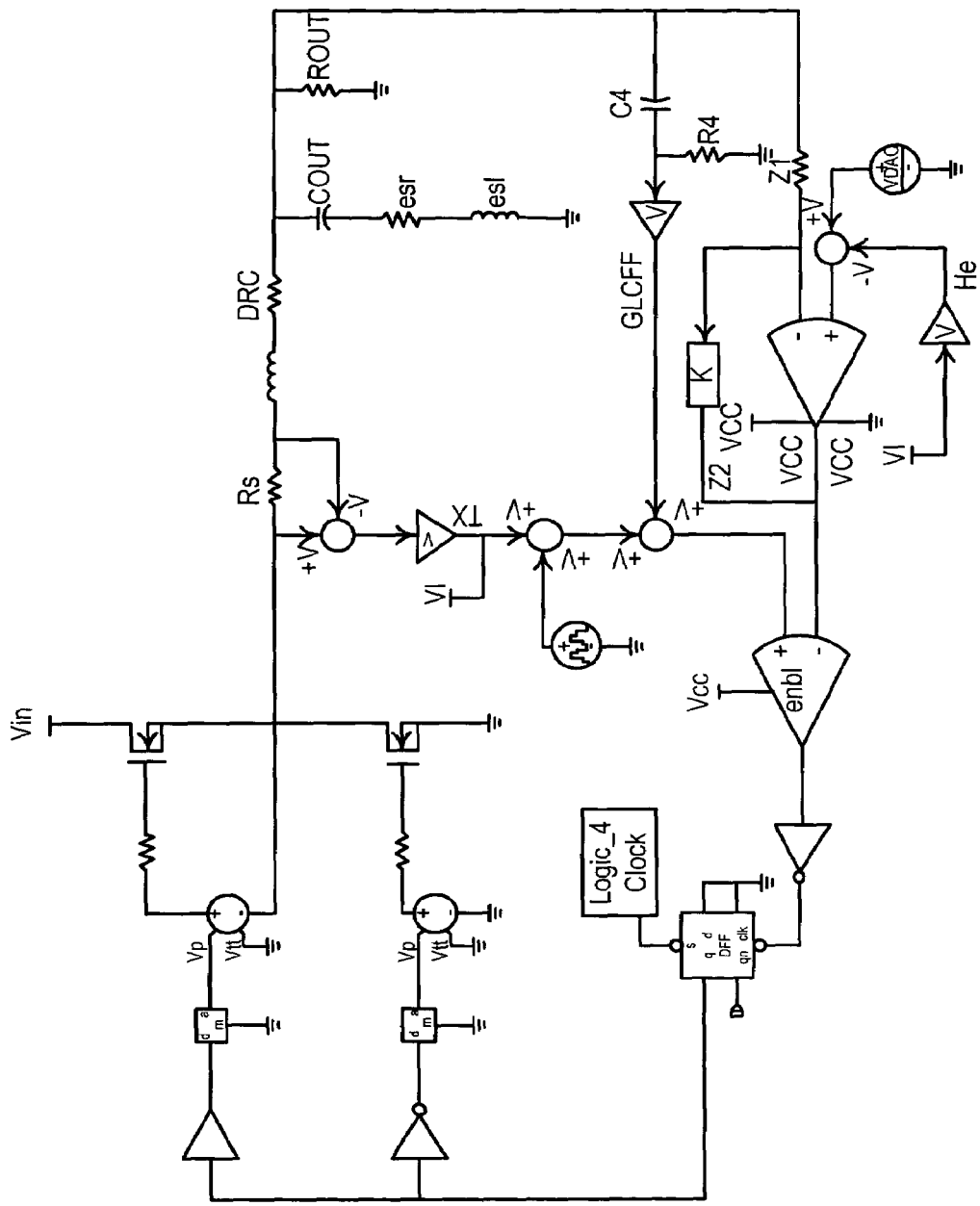
FIG. 3 depicts a circuit diagram of a power supply having electrical components corresponding to frequency domain model of FIG. 2.

Referring now to FIG. 2, a block diagram identifies the position of the filter pole in frequency compensation and an optimized gain expression for an example of the information handling system power supply circuit depicted in FIG. 1, including a power supply 12 having a current feed back control loop 18, a voltage feedback loop 20 and an output capacitance feed forward control loop 24. FIG. 3 depicts electrical components and associated values for an example of a power supply circuit that operates under frequency domain representation of FIG. 2. The current $I_L$ sensed at the output of inductor 16 for current feed back control loop 18 is modeled as the output of current $I_{OUT}$ output from power supply 12 to pass through block -ZT/ZL 26 and summed with the output of block $MOD_I$ 28 representing the sum of control inputs based on sensed measurements of $I_L$ and $V_{OUT}$, the voltage measurement at CPU 12. The voltage $V_{OUT}$ sensed for voltage feed back loop 20 is modeled as the output of current $I_{OUT}$ passing through block ZT 30 and summed with the output of block $MOD_V$ 32 representing the sum of control inputs based on sensed measurements of $I_L$ and $V_{OUT}$. The modeling equations for ZT and ZL in blocks 26 and 30 are:

$$Z_L(m, n) := \frac{DCR}{N_\phi} + \frac{R_S}{N_\phi} + s(m, n)\frac{L_{PH}}{N_\phi}$$

$$Z_T(m,n) := (R_{OUT}^{-1} + Z_L(m,n)^{-1} + Z_C(m,n)^{-1})^{-1}$$

where:

$$Z_C(m, n) := \frac{1}{s(m, n)C_{OUT}} + esr + s(m, n)esl$$

The modeling equations for the modifications to current and voltage provided by the sum of feed back and feed forward control loops are:

$$MOD_V(m,n): F_M \frac{(Z_{C(m,n)}^{-1} + R_{OUT}^{-1})}{(Z_C(m,n)^{-1} + R_{OUT}^{-1})^{-1} + Z_L(m,n)}$$

$$MOD_I(m,n) := F_m \frac{1}{(Z_C(m,n)^{-1} + R_{OUT}^{-1})^{-1} + Z_L(m,n)}$$

where:

$$S_n := \frac{V_{in} - V_{out}}{L_{PH}} TX \cdot R_S \cdot Y$$

$$S_e := V_{PK} \cdot f_s \cdot (1-Y)$$

$$F_m := \frac{f_s \cdot V_{in}}{S_e + S_n}$$

The current and voltage output of power supply 12 is fed forward or backward through five control loops that sum to determine the values of $MOD_I$ 28 and $MOD_V$ 32. Block $A_I$ 34 represents the model of feed back control loop 18 that senses current from inductor 16 and is modeled with the equation:

$$A_I(m,n) := -\left(X + \frac{Z_2(m,n)}{Z_1}\right) R_{PROG} \cdot TX \cdot H2(m,n)$$

where X and Z1 are constants and:

$$Z_2(m,n) := Z_1\left(|a| + \frac{|b|}{s(m,n)}\right)$$

$$a := -\frac{N_\phi F_M C_{OUT} G_{LCFF} R_{IMVP}^2 - N_\phi F_m C_{OUT} R_{IMVP}^2 k_r -}{N_\phi R_{IMVP}^2 F_m C_{OUT}}$$

$$b := \frac{N_\phi R_{IMVP} F_m k_f - N_\phi R_{IMVP} F_m k_r - N_\phi F_m TX \cdot}{N_\phi R_{IMVP}^2 F_m C_{OUT}}$$

$$s(m,n) := j \cdot 2 \cdot \pi \cdot f(m,n)$$

Block $A_{CLI}$ 36 and Block $A_{CLV}$ 38 represent models for additional feed forward and feed back loops that model the impact of inductance and capacitance from sensed current and voltage, and are modeled by the equations:

$$A_{CLI}(m,n) := TX \cdot R_S \cdot He(m,n) \cdot Y$$

$$A_{CLV} := -k_f + k_r$$

where Y is a constant and:

$$R_{PROG} := R_S$$

$$TX := \frac{R_{IMVP}}{R_{PROG}}$$

$$Qz := \frac{-2}{\pi} \cdot \omega_n := 2 \cdot \pi \cdot \frac{f_s}{2}$$

$$He2(m,n) := 1 + \frac{s(m,n)}{\omega_n Q_z} + \frac{s(m,n)^2}{\omega_n^2}$$

$$He(m,n) := \begin{array}{l} 1 \cdot \text{if} \cdot X = 0 \\ He2(m,n) \text{otherwise} \end{array}$$

$$D := \frac{V_{out}}{V_{in}}$$

$$kf := \frac{-D \cdot R_S \cdot TX}{L_{PH} \cdot f_s}\left(1 - \frac{D}{2}\right) \cdot Y$$

$$kr := \frac{(1-D)^2 \cdot R_S \cdot TX}{2 \cdot L_{PH} \cdot F_s} \cdot Y$$

Block $A_V$ 40 represents a model of feed back control loop 20 that senses voltage at CPU 12 and is modeled by the equation:

$$A_V(m,n) := \frac{-Z_2(m,n)}{Z_1}$$

Block ALCFF 42 represents a model of feed forward control loop 24 that senses voltage after output capacitors 22 to replicate current present at output capacitors 22 and is modeled by the equation:

$$A_{LCFF}(m,n) := -G_{LCFF} \frac{s(m,n) \cdot R4 \cdot C4}{s(m,n) \cdot R4 \cdot C4 + 1}$$

where:

$$G_{LCFF} := \frac{L_{PH} - N_\phi \cdot C_{OUT} \cdot R_{IMVP}^2}{N_\phi \cdot F_M \cdot C_{OUT} \cdot R_{IMVP}^2}$$

The insertion of capacitance feed forward control loop 24 to compensate for capacitance current results in reduced response time of power supply 14 to changes in power usage by CPU 12 with some adjustment to the gain factor used for optimization at voltage feed back loop 20. In one exemplary embodiment, the following constant values are applied:

| | | |
|---|---|---|
| R1: = 30 · KΩ | C1: = $10^{-100}$ μF | |
| R2: = 60 · KΩ | C2: = $10^{-100}$ μF | $Z_1$: = 2.7 · KΩ |
| R3: = 10 · KΩ | C3: = $10^{-100}$ μF | X = 0 |
| R4: = 10 · KΩ | $C4 := \frac{esr \cdot C_{OUT}}{R4}$ | Y = 1 |
| $C_{OUT}$ = 3810 · μF | | |

-continued $$R_{OUT} := \frac{V_{DAC}}{I_{MIN}} - R_{IMVP}$$

$f_S: = 300 \cdot \text{KHZ}$ esr: = $R_{IMVP}$
f(m, n): = $n \cdot 10^m$ Hz
$L_{PH}$ = 0.6 · μH
DCR: = 1 · mΩ
$R_{IMVP}$: = 1.5 · mΩ
$N_\phi$: = 3
$R_S$: = 2.1 · mΩ n: = 1, 1.1 ... 10
m: = 0 ... floor(log*$N_\phi \cdot f_S \cdot$ sec))
$V_{PK}$: = 1 · V
$V_{in}$: = 20 · V $V_{OUT}$: = 1.525 · V
esl: = 0 · nH
$V_{DAC}$: = 1.525 · V
$I_{MIN}$: = $10^{-100}$ · A Although the present invention has been described in detail, it should be understood that various changes, substitutions and alterations can be made hereto without departing from the spirit and scope of the invention as defined by the appended claims.

What is claimed is:

1. An information handling system comprising:
   a CPU operable to process information, the CPU having variable power demands for power supplied within predetermined voltage and current tolerances;
   a power supply interfaced with the CPU and operable to provide power to the CPU at the variable power demands within a response time;
   one or more capacitors disposed between the power supply and the CPU, the capacitors operable to provide capacitance to buffer current between the power supply and CPU to compensate for power supply response times to current load changes; and
   a capacitance feed forward loop interfaced between the capacitors and the CPU and operable to replicate current present in the capacitors and to communicate the replicated current to the power supply with a gain selected to adjust power supply output to fall within the predetermined voltage and current tolerances in a reduced response time.

2. The information handling system of claim 1 wherein the capacitance feed forward loop comprises a filter having a frequency compensation pole.

3. The information handling system of claim 2 wherein power is provided to the CPU from the power supply through an equivalent series resistance, the pole canceling the zero created by the equivalent series resistance and the output capacitance.

4. The information handling system of claim 1 further comprising:
   one or more inductors disposed between the power supply and the capacitors;
   a current feed back loop communicating compensation to the power supply for current sensed between the inductors and the capacitors; and
   a voltage feed back loop communicating compensation to the power supply for voltage sensed at the CPU.

5. A method for supplying power to a microprocessor having variable power demands, the method comprising:
   outputting power from a power supply to the microprocessor;
   communicating variations in microprocessor power demand to the power supply;
   adjusting power output from the power supply in response to the variations in microprocessor power demand within a predetermined response time;
   buffering current with one or more capacitors to manage differences between power supplied by the power supply and power demanded by the microprocessor over the response time;
   estimating the current present in the capacitors; and
   reducing the response time by communicating the estimated current present in the capacitors to the power supply and adjusting power output from the power supply in response to the estimated current present in the capacitors.

6. The method of claim 5 wherein communicating variations in microprocessor power demand further comprises sensing current output from the power supply and voltage at the microprocessor and communicating the sensed current and voltage to the power supply as gain adjusted compensation signals.

7. The method of claim 5 wherein the microprocessor comprises an information handling system CPU.

8. The method of claim 5 wherein estimating the current present in the capacitors further comprises:
   sensing the current in the capacitors and the microprocessor;
   applying the sensed current to a filter having a pole that cancels a zero created by the equivalent series resistance associated with the power supply and the capacitance associated with the capacitors.

9. The method of claim 8 wherein reducing the response time further comprises:
   applying a gain parameter to the estimated current present in the capacitors to generate a compensation signal;
   communicating the compensation signal to the power supply; and
   adjusting the power supply output in accordance with the compensation signal.

10. A system for controlling power supplied to a microprocessor having variable power demands, the system comprising:
    a power supply operable to output power to the microprocessor to meet the variable demands;
    one or more capacitors disposed between the power supply and the microprocessors, the capacitors operable to buffer current during variances of power demanded by the microprocessor to maintain power supplied to the microprocessor within predetermined tolerances;
    a capacitance compensation loop operable to sense voltage change across the capacitor, to apply the sensed voltage change to estimate the current of the capacitor, and to determine a compensation signal from the estimate for communication with the power supply to adjust power output.

11. The system of claim 10 further comprising:
a current compensation loop operable to sense current in the capacitor to determine a current compensation signal for communication with the power supply.

12. The system of claim 10 further comprising:
a voltage compensation loop operable to sense voltage at the CPU to determine a voltage compensation signal for communication with the power supply.

13. The system of claim 10 wherein the capacitance compensation loop comprises a feed forward compensation loop.

14. The system of claim 13 wherein the capacitance compensation loop comprises a frequency filter that replicates current present in the capacitor.

15. The system of claim 14 wherein the frequency filter comprises a pole positioned in frequency compensation to cancel a zero associated with power supply equivalent series resistance and capacitance.

16. The system of claim 10 wherein the power supply comprises a multiphase power supply.

17. The system of claim 10 wherein the power supply comprises a single phase power supply.

18. A method for supplying power to an information handling system component having variable power demands, the method comprising:
outputting power from a power supply to the component;
communicating variations in component power demand to the power supply;
adjusting power output from the power supply in response to the variations in component power demand;
buffering current to the component with one or more capacitors;
estimating a state of the one or more capacitors; and
communicating the estimated state of the one or more capacitors to the power supply;
adjusting power output from the power supply in response to the estimated state of the one or more capacitors.

19. The method of claim 18 wherein estimating the state of the one or more capacitors further comprises:
sensing the current in the capacitors and the microprocessor; and
feeding forward the sensed current to the power supply.

* * * * *